United States Patent [19]

Meyn

[11] Patent Number: 5,569,067
[45] Date of Patent: Oct. 29, 1996

[54] METHOD OF AND APPARATUS FOR SEPARATING INTO PARTS THE ENTRAILS PACKAGE REMOVED FROM A SLAUGHTERED BIRD

[75] Inventor: Cornelis Meyn, Oostzaan, Netherlands

[73] Assignee: Machinefabriek Meyn B.V., Oostzaan, Netherlands

[21] Appl. No.: 427,073

[22] Filed: Apr. 21, 1995

[30] Foreign Application Priority Data

Apr. 26, 1994 [NL] Netherlands .................. 9400665

[51] Int. Cl.⁶ .................................... A22C 21/06
[52] U.S. Cl. .................................... 452/106; 452/111
[58] Field of Search .................. 452/106, 111, 452/112, 117, 118

[56] References Cited

U.S. PATENT DOCUMENTS

| | | |
|---|---|---|
| 4,608,732 | 9/1986 | Hill et al. .................. 452/111 |
| 4,951,352 | 8/1990 | Harben, III et al. |
| 5,026,317 | 6/1991 | Kennedy .................. 452/106 |
| 5,041,052 | 8/1991 | Conner et al. |
| 5,041,053 | 8/1991 | Ellis et al. |
| 5,152,715 | 10/1992 | van de Eerden et al. |
| 5,186,678 | 2/1993 | Conner et al. .................. 452/106 |
| 5,318,428 | 6/1994 | Meyn . |

FOREIGN PATENT DOCUMENTS

| | | |
|---|---|---|
| 813138 | 4/1974 | Belgium . |
| 0439904A1 | 8/1991 | European Pat. Off. |
| 0482700A1 | 4/1992 | European Pat. Off. |
| 0541150A1 | 5/1993 | European Pat. Off. |
| 0587253A2 | 3/1994 | European Pat. Off. |
| 1415153 | 11/1975 | United Kingdom . |
| 2004175 | 3/1979 | United Kingdom . |

*Primary Examiner*—Willis Little
*Attorney, Agent, or Firm*—Dority & Manning

[57] ABSTRACT

The invention relates to a method for separating into parts an entrails package removed from a slaughtered bird, the package comprising gizzard, proventriculus, heart, lungs, liver, gallbladder and intestines. The method includes loosening the tissue connections between the gizzard and the intestines, separating the entrails package in a package comprising liver, gallbladder and intestines on one hand and a package comprising gizzard, proventriculus, heart and lungs on the other hand, as well as separating the gizzard with proventriculus from the heart with lungs. The invention further relates to an apparatus for carrying out such a method.

21 Claims, 3 Drawing Sheets

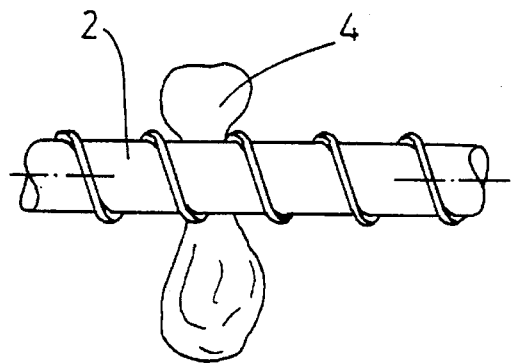
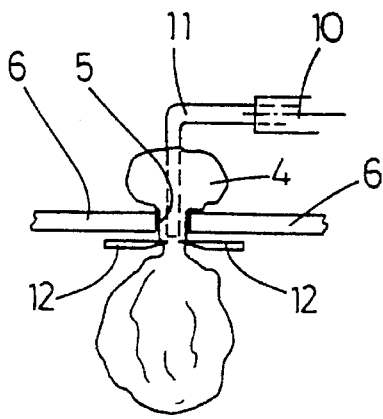
Fig.2
Fig.3
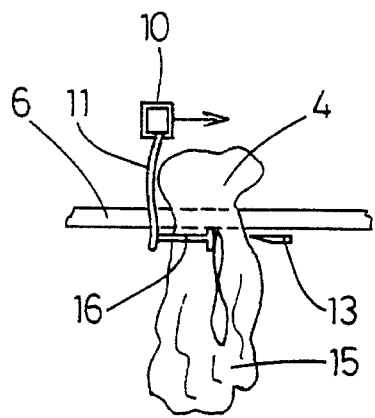
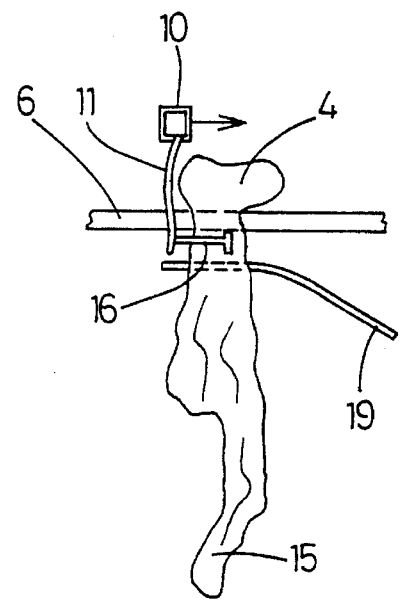
Fig.4
Fig.5

METHOD OF AND APPARATUS FOR SEPARATING INTO PARTS THE ENTRAILS PACKAGE REMOVED FROM A SLAUGHTERED BIRD

BACKGROUND OF THE INVENTION

Firstly the invention relates to a method of separating into parts the entrails package removed from a slaughtered bird, said package comprising gizzard, proventriculus, heart, lungs, liver, gallbladder and intestines. Secondly the invention relates to an apparatus for carrying out said method.

After the entrails package is removed from the body cavity of a slaughtered bird it has to be separated into parts, because said parts have different destinations. In this aspect it is of importance that this separating into parts of the entrails package occurs in a uniform and reproducible way, also at the high production rates applied at modern slaughtering lines.

OBJECTS AND SUMMARY OF THE INVENTION

It is an object of the invention to provide a method and apparatus as stated above which effectively separates into parts the entrails packages removed from poultry. Additional objects and advantages of the invention will be set forth in the following description, or may be obvious from the description, or may be learned through practice of the invention.

Thus, the method according to the invention is characterized by the following steps:
a. loosening the tissue connections between the gizzard and the intestines, such that the intestines remain only indirectly connected to the gizzard by means of the other entrails parts;
b. separating the entrails package in a package comprising liver, gallbladder and intestines on the one hand and a package comprising gizzard, proventriculus, heart and lungs on the other hand;
c. separating the liver from the gallbladder with intestines and separating the gizzard with proventriculus from the heart with lungs.

In an entrails package which just has been removed from the body cavity of a slaughtered bird there is a direct connection between the intestines and the gizzard. By loosening the tissue connections between the gizzard and the intestines, this direct connection is eliminated and the intestines then remain only indirectly connected to the gizzard by means of the other entrails parts. As a result, the entrails package may be positioned such that one obtains a succession comprising gizzard, proventriculus, heart, lungs, liver, gallbladder and intestines, such that it is possible to divide the entrails package in accordance with the second step of the method according to the invention into two packages, that is a package comprising liver, gallbladder and intestines and a package comprising gizzard, proventriculus, heart and lungs: which thereafter are separated in separate parts.

Using the method according to the invention it is possible to separate an entrails package into parts in a quick, reproducible and uniform way. Further the method is extremely fit to be automatized.

In accordance with the present invention, the apparatus for separating into parts the entrails package removed from slaughtered bird is characterized by the following means:
a. loosening means for loosening the direct connection between gizzard and intestines;
b. first separating means for separating the entrails package in a package comprising liver, gallbladder and intestines on the one hand and a package comprising gizzard, proventriculus, heart and lungs at the other hand;
c. second separating means for separating the liver from the gallbladder with intestines and for separating the gizzard with proventriculus from the heart with lungs;
d. transporting means for moving the package or parts thereof along the apparatus.

By means of such an apparatus, the separation occurs fully automatically such that manually separating entrails packages is no longer necessary. Further, the apparatus leads to extremely reproducible results.

In accordance with a preferred embodiment of such an apparatus, the loosening means comprises first cutting means for partly cutting the tissue surrounding the package just below the gizzard, second cutting means for cutting loose the gizzard from the intestines and first guides for stretching the package between the gizzard and the proventriculus.

Because the respective tissue is partly cut just below the gizzard it is, after the gizzard is cut loose from the intestines, possible by stretching the package between the gizzard and proventriculus to loosen the intestines in such a way from the gizzard that they will depend fully from the lower side of the entrails package. If the surrounding tissue is not cut, the risk occurs that the entrails package is torn at unwanted places.

In this aspect, it is advantageous if the first guides comprise two plates defining therebetween a slot, which plates in the direction of movement of the package diverge from the track followed by the gizzard, said plates further engaging the proventriculus between the gizzard and proventriculus.

The slot between these plates houses a small tissue part connecting the gizzard with the proventriculus. Next, during the movement of the package, the proventriculus is pulled down such that the tissue connections between the gizzard and intestines are loosened.

In this respect, it is preferred that at least one of the plates is resiliently settable to accommodate packages having different dimensions. Because of the resilient setting, it is possible on the one hand to avoid that small proventriculi are pulled through the slot and, on the other hand, that in case of large packages a jamming of tissue in the slot does not occur.

An extremely effective embodiment of the apparatus according to the invention is obtained if the first separating means comprises an assembly with a supporting plate engaging the lower side of the liver, said supporting plate being provided with a guide slot for guiding the gallbladder and intestines depending from the lower side of the liver, and with a stationary knife positioned above the supporting plate for cutting through the entrails package above the liver. After the package has been received in the respective assembly, the liver is positioned at the upper side of the supporting plate, whereas the gallbladder and intestines are positioned therebelow. After the package is cut through above the liver this partial package remains suspended from the supporting plate with the liver.

In this aspect, it is advantageous if the knife comprises a cutting edge inclined relative to the guide slot and having a blunt beginning. When moving the entrails package, the liver firstly is pushed between the supporting plate and the knife at the blunt beginning of the knife before being cut loose. In such a way, it is possible to guarantee in a controlled way that the cut provided by the knife does not occur in the liver, but always just thereabove.

In order to guarantee that the partial package comprising liver, gallbladder and intestines, is moved by the apparatus after being cut loose from the remainder of the entrails package, it is preferred that the apparatus is provided with auxiliary transporting means for moving the package comprising liver, gallbladder and intestines.

An embodiment of the apparatus according to the invention which is attractive in a constructive way, is characterized in that the transporting means comprises radial arms rotatable about a central vertical axis, said arms each being provided with an outer end projecting into a slot of a stationary support for the gizzards of the entrails package extending around the central axis, said outer ends further engaging behind the gizzards. In such a way, the apparatus obtains a carrousel-like configuration, which because of its space-saving construction is already costumary in respect of several processing apparatuses in the poultry industry.

Further, in this aspect, it is advantageous if the slot follows a track shaped such that, as seen in the direction of movement of the arms, the distance between the slot and the central axis decreases along at least part of the track, wherein the arms are constructed to have a variable length and wherein the auxiliary transporting means comprise a wheel positioned below the support and being rotatable about the central axis in synchronisation with the arms, the wheel having at its circumferential edge carriers for the packages comprising liver, gallbladder and intestines corresponding with the arms, and wherein the shape of the slot is such that, as seen in a plan view, it already reaches the circumferential track of the carriers ahead of the first separating means. At the moment at which the entrails package has been divided in the two partial packages, the entrails package, by means of the slot, is moved into engagement with the circumferential edge of the rotatable wheel such that this rotatable wheel with its carriers can further transport the partial package comprising liver, gallbladder and intestines. At this moment, the radial arms still take care of transporting the other partial package comprising gizzard, proventriculus, heart and lungs.

Hereinafter the invention will be elucidated referring to the drawing, in which an embodiment of an apparatus according to the invention is illustrated.

BRIEF DESCRIPTION OF THE DRAWINGS

FIG. 2 shows a view according to II in FIG. 1, and

FIGS. 3–8 show sections according to III–III until VII-I–VIII in FIG. 1 to clarify successive steps of the method carried out with the apparatus shown in FIG. 1.

DETAILED DESCRIPTION OF THE PREFERRED EMBODIMENTS

Figure 1:
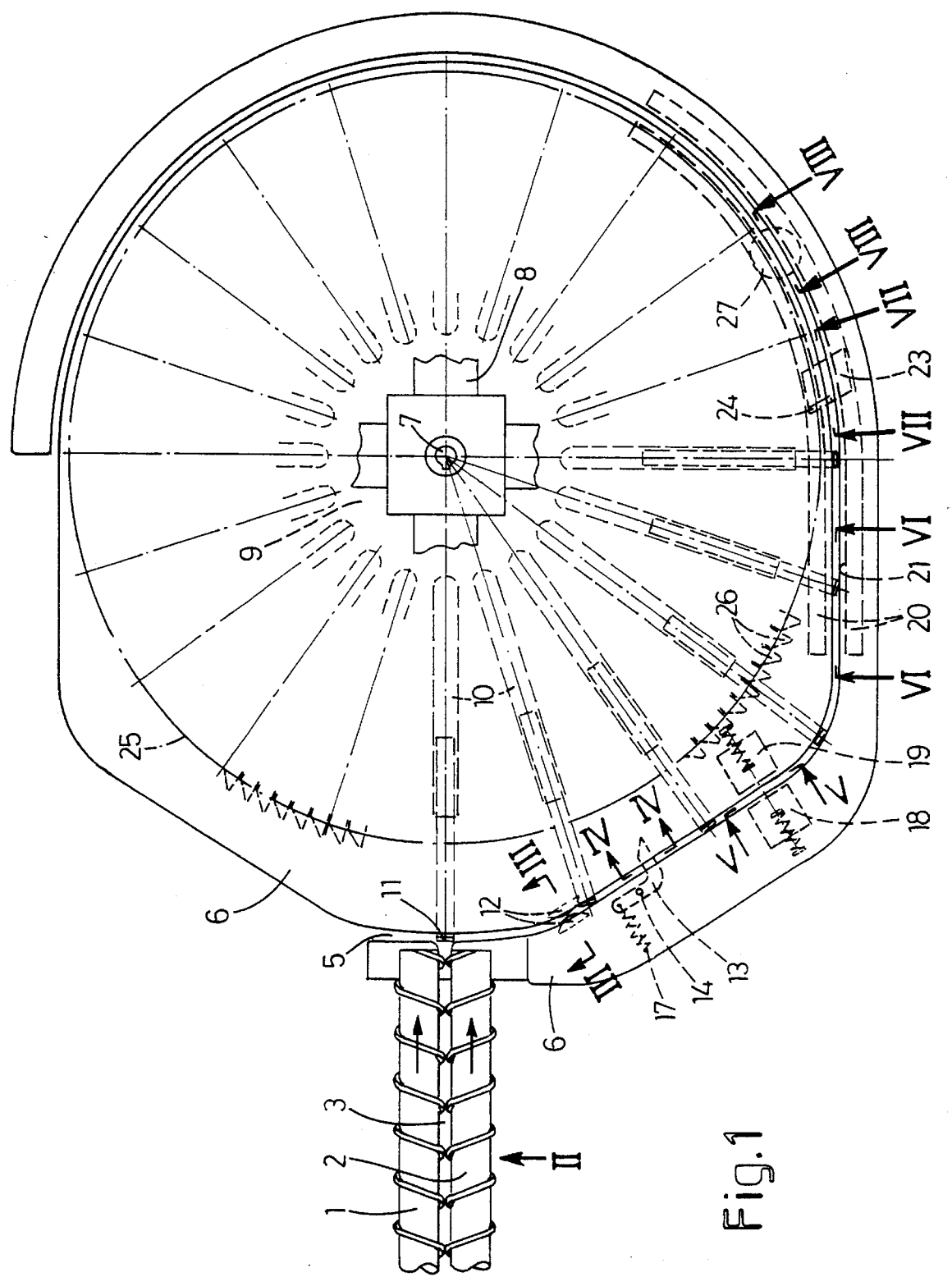
FIG. 1 shows schematically a plan view of an embodiment of the apparatus according to the invention.

Reference will now be made in detail to the presently preferred embodiments of the invention, one or more examples of which are illustrated in the drawings. Each example is provided by way of explanation of the invention, and not meant as a limitation of the invention. In fact, it will be apparent to those skilled in the art that various modifications can be made to the present invention without departing from the scope and spirit of the invention.

The apparatus indicated schematically in a top plan view in FIG. 1 is meant for separating into parts an entrails package removed from a slaughtered bird, said package generally comprising gizzard, proventriculus, heart, lungs, liver, gallbladder and intestines. For supplying such an entrails package, supply means are provided comprising two cooperating supply screws 1, 2 positioned alongside each other, which define therebetween a slot 3 through which the entire package can depend with the exception of the gizzard. As illustrated in FIG. 2, the gizzard 4 is positioned on top of the supply screws 1, 2 whereas the remaining part of the entrails package extends downwardly through the slot and is suspended between the supply screws 1, 2. The direction of transportation of the screws is indicated with arrows in FIG. 1.

Generally the supply screws 1, 2 will supply the entrails package in such a way that the proventriculus is positioned at the rearward side.

The ends of the supply screws 1, 2 join a slot 5 shaped in a plate-like stationary support 6. In this slot 5 the entrails packages are received such that the gizzard rests on top of the support 6, whereas the remainder of the package depends below the support.

The support 6 extends around a central vertical axis 7 which is journalled in a frame 8 indicated only schematically. Onto the axis 7, further a star-shaped driving wheel 9 is mounted which is provided of a large number of radial arms 10. The radial arms 10 each are provided with an outer end 11 (see FIG. 3) projecting into the slot 5 and engaging behind gizzards 4.

For reasons to be explained later, arms 10 have a variable length.

After leaving the supply screws 1, 2 an entrails package reaches the slot 5 in the support 6. The outer end 11 of a radial arm 10 will engage behind the package and will move it along the slot (anti-clockwise as seen in FIG. 1).

Firstly, the packages reach loosening means for loosening the direct connection between the gizzard and the intestines. To start with, these loosening means comprise first cutting means shaped as two knives 12 which, as shown in FIG. 3, are attached to and below the support 6 and which join the slot 5. Basically it is conceivable too that these knives are positioned just above the support or in the slot 5.

Using these knives 12, the tissue surrounding the package is partly cut just below the gizzard 4 without cutting through it entirely.

After passing the knives 12, the package, driven by the arms 10, reaches a second cutting means positioned below the support 6 and being shaped as a movable knife 13 which can rotate about an axis 14 (see FIG. 1). During the passage of an entrails package, the intestines 15 positioned at the forward side thereof (see FIG. 4) are cut through in the vicinity of the gizzard 4. However, before the proventriculus, which is positioned immediately behind the intestines 15 and which joins the gizzard 4, is cut by the knife 13, an abutment 16 (see FIG. 4) mounted on the outer end 11 of the respective radial arm 10 engages the knife 13 and pivots it, contrary to the force of a spring 17, away from the track of the entrails package. Only after the passage of the entrails package the knife 13 pivots back towards its position illustrated in FIG. 1. Of course the pivoting of the knife 13 also may be controlled by sensors which register the moment at which the intestines have passed the knife.

The package now mainly has a shape as shown schematically in FIG. 5. The gizzard 4 is positioned above the support 6 and completely at the bottom the intestines 15 depend. Next, this package reaches guidings positioned below the support 6 shaped as two plates 18, 19 defining a slot therebetween. As appears from FIG. 5 these plates 18, 19 diverge, as seen in the direction of movement of the package, from the track followed by the gizzard 4 (which is defined by the support 6). As schematically indicated in FIG. 1, these plates 18 and 19 are resiliently mounted such that an automatized adoption to the dimensions of a passing entrails package may occur.

During the passage of a package, the plates 18 and 19 will engage between the gizzard 4 and the proventriculus positioned therebelow and will pull down the proventriculus. Thus, the tissue surrounding the package and being cut previously by the knives 12 (see FIG. 3) is pulled loose. Like this, a package is obtained in which from top to bottom a clear succession is visible comprising gizzard 4, proventriculus, hearts, lungs, liver, gallbladder and finally intestines 15. In the figures these parts of the package are not all indicated separately.

After passing the plates 18 and 19, the package has passed the loosening means for loosening the direct connection between the gizzard and the intestines. Next the package will at first reach separating means for dividing the entrails package in a package comprising liver, gallbladder and intestines on the one hand and a package comprising gizzard, proventriculus, heart and lungs at the other hand. These first separating means will now be described.

Figure 6:
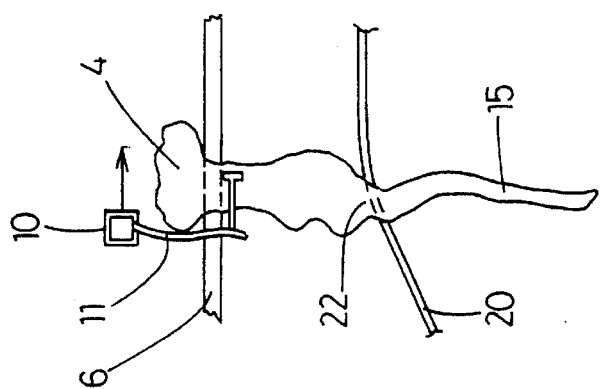

To the first separating means a supporting plate 20 belongs which is positioned below the support 6 too and which comprises a guiding slot 21. As appears from FIG. 6, the supporting plate 20 initially is positioned at some distance from the support 6, but closes in to said support 6 in the direction of movement of the packages. The intestines 15 will descend through the guiding slot 21 and will depend below the supporting plate 20. The liver (indicated with 22 in FIG. 6) positioned immediately above the intestines 15 will not be able to pass the guiding slot 21 and will rest upon the supporting plate 20.

Figure 7:
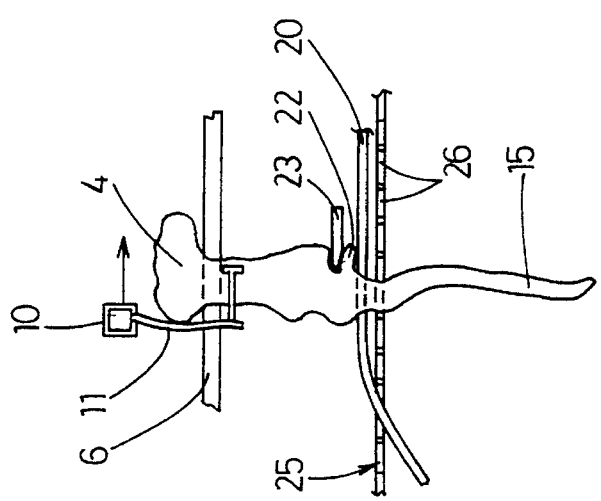

Above the supporting plate 20 there is provided a stationary knife 23 with an inclined orientation relative to the guiding slot 21 and having a blunt beginning of its cutting edge (indicated with 24 in FIG. 1). The package, while still being moved by the outer end 11 of a radial arm 10, but now also by carriers 26 to be described later, reaches the knife 23 while the liver 22 rests upon the supporting plate 20, and because of the blunt cutting edge 24 the liver will be pulled between the knife and the supporting plate 20 (see FIG. 7). Next, the respective section of the package reaches the sharp part of the knife 23 and the package will be cut through just above the liver. In this way, on the one hand an upper package is created being suspended from the support 6 with the gizzard 4 and comprising gizzard, proventriculus, heart and lungs, as well as a lower package suspending from the supporting plate 20 with the liver 22 and comprising liver and, below the supporting plate, gallbladder with intestines 15.

Figure 8:
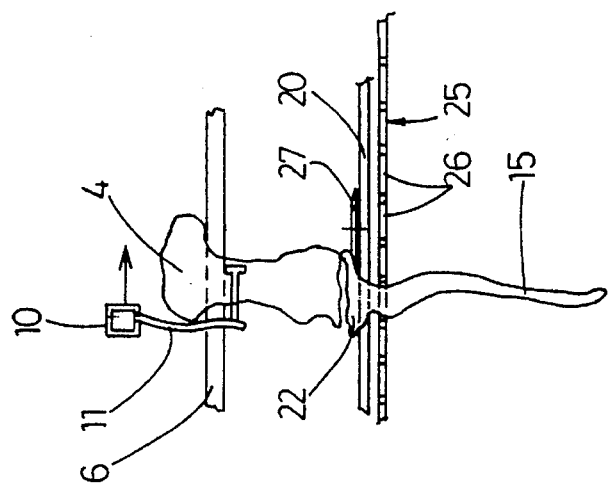

The radial arms 10 acting as transporting means for the packages as noted engage the gizzard 4 with their outer ends 11. However, after the packages have been cut through just above the liver 22 these radial arms 10 no longer can move forward the loosened lower packages comprising liver, gallbladder and intestines. To provide a solution for this problem below the support 6 a wheel 25 is mounted onto the central vertical axis 7 which rotates in synchronisation with the arms 10. At its circumferential edge, this wheel 25 comprises carriers 26. For the sake of clarity these carriers 26 are schematically indicated by a dot and dash line along a large part of the circumference of the wheel 25. These carriers 26 may engage the intestines 15 just below the supporting plate 20 (see FIG. 7 and 8). As a result the lower packages also may be moved along the apparatus.

In this context it is important to note, that the slot 5 in the support 6 follows such a track that, as seen in the direction of movement of the arms 10, the distance between the slot and the central axis 7 decreases along at least part of said track. Specifically it appears that, as seen from above, the slot 5 finally reaches the circumferential track followed by the carriers 26 of the wheel 25 ahead of the knife 23. This means, that a propulsion of the lower packages is guaranteed in a reliable way and that already before cutting loose these package assistance is given in respect of pulling the liver 22 below the knife 23.

Further now the reason becomes clear why the radial arms 10 have a variable length. Like this the varying distance between the slot 5 and the central axis 7, about which the arms 10 rotate, may be compensated for.

After the entrails package has been divided in such a way into two partial packages, the partial packages can be separated into separate parts. The separation of the liver and the gallbladder with gizzard may occur through a knife (for example a rotating knife 27) positioned just above the supporting plate 20, such that the liver is cut loose from the intestines 15 and gallbladder. Such a positioning of the knife 27 is advantageous because it is avoided in such a way that the gallbladder is hit.

The separate parts especially liver 22 on the one hand and gallbladder with intestines 15 at the other hand) may be discharged individually in any appropriate way.

The upper package comprising gizzard 4 and proventriculus depending therefrom, heart, and lungs also may be separated into separate parts. It is conceivable per se that this also occurs using a knife corresponding with knife 27, but it is possible too that other techniques, known per se, are applied.

The invention is not limited to the embodiment described before, which can be varied widely within the scope as defined by the claims. Thus it may be noted, that the method and apparatus according to the invention are also appropriate for processing entrails packages having a configuration which slightly differs from the configuration described. The amendments necessary to accommodate for this fall within the scope of the invention.

I claim:

1. A method for automatically processing the entrails packages from a slaughtered bird into parts, the entrails packages including gizzard, proventriculus, heart, lungs, liver, gallbladder, and intestines, said method comprising the steps of automatically conveying the entrails package with a conveyor device through an automated loosening device and first loosening the direct tissue connection between the gizzard and intestines so that the intestines remain only indirectly connected to the gizzard through other parts of the entrails package; conveying the entrails packages with loosened tissue connection through a first automatic separating device and automatically separating the entrails packages into a first package including liver, gallbladder, and intestines and a second package including gizzard, proventriculus, heart, and lungs; and separately conveying the first and second packages for further processing.

2. The process as in claim 1, wherein said further processing comprises conveying said first package and second package to automated separating devices and further separating said first and second packages into further individual parts.

3. The process as in claim 2, comprising in the first package separating the liver from the gallbladder and intestines, and in the second package separating the gizzard from the proventriculus, heart and lungs.

4. The process as in claim 1, wherein said loosening the direct tissue between the gizzard and the intestines comprises partially cutting the tissue surrounding the entrails package just below the gizzard, cutting the intestines loose from the gizzard, and stretching the package between the gizzard and proventriculus so that the previously partially cut tissue is pulled loose.

5. The process as in claim 4, wherein said separating the entrails package into first and second packages comprises cutting the entrails package just above the liver after the previously partially cut tissue is pulled loose.

6. An automated apparatus for processing entrails packages removed from slaughtered poultry into parts, the entrails packages including gizzard, proventriculus, heart, lungs, liver, gallbladder, and intestines, said apparatus comprising:

a transporting device configured to automatically convey the entrails packages or separate parts thereof through said apparatus, said transporting device receiving and conveying the entrails packages so that the gizzards are positioned at a top position;

a loosening device configured to automatically loosen direct tissue connections between the gizzard and intestines so that the intestines remain connected to the gizzard indirectly through other parts of said entrails package;

a first separating device disposed operably downstream from said loosening device, said first separating device configured to automatically separate said conveyed entrails packages into a first package including liver, gallbladder, and intestines, and a second package including gizzard, proventriculus, heart and lungs; and said transporting device further comprising first and second package conveying devices for separately conveying said first and second packages.

7. The apparatus as in claim 6, further comprising a supply device disposed to convey said entrails packages to said transporting device.

8. The apparatus as in claim 7, wherein said supply device comprises two adjacently disposed supply screws defining a travelling slot therebetween, said slot configured so that the gizzard is conveyed above said screws and the remainder of said entrails packages extends through said slot and hangs below said screws.

9. The apparatus as in claim 6, further comprising at least one second separating device operably downstream from said first separating device configured for automatically separating one of said first and second packages into further individual parts.

10. The apparatus as in claim 9, wherein said second separating device comprises a cutting device configured to cut said liver from said first package.

11. The apparatus as in claim 9, wherein said second separating device comprises a cutting device configured to cut said gizzard from said second package.

12. The apparatus as in claim 6, further comprising second separating devices operably downstream from said first separating device having cutting devices configured for automatically cutting the liver from said first package and the gizzard from said second package.

13. The apparatus as in claim 6, wherein said loosening device comprises a first cutting mechanism disposed to partially cut tissue surrounding the entrails package just below the gizzard, and a second cutting mechanism disposed to cut loose the gizzard from the intestines, and guide mechanisms disposed in the path of the conveyed entrails package to engage and stretch the package between the gizzard and proventriculus.

14. The apparatus as in claim 13, wherein said first cutting mechanism comprises oppositely disposed knives positioned to engage the conveyed entrails package just below the gizzard, said second cutting mechanism comprising a positionable knife automatically movable between a position for cutting the intestines from the gizzard and a position out of reach of the remainder of the conveyed entrails package.

15. The apparatus as in claim 13, wherein said guide mechanisms comprise plates defining a slot therebetween, said plates configured so as to diverge away from the position of the gizzard conveyed by said transporting device in a direction of conveyance, said plates disposed to initially engage the entrails package between the gizzard and proventriculus.

16. The apparatus as in claim 15, wherein at least one of said plates is resiliently mounted to accommodate different sized packages.

17. The apparatus as in claim 6, wherein said first separating device comprises a supporting plate disposed to engage a lower side of the liver, said supporting plate comprising a guide slot defined therein for guiding the gallbladder and intestines depending from the lower side of the liver, said first separating device further comprising a knife disposed above said supporting plate for cutting through the conveyed entrails package above the liver.

18. The apparatus as in claim 17, wherein said knife comprises a blunt initial edge and a cutting edge inclined relative to said guide slot.

19. The apparatus as in claim 17, wherein said transporting device second package conveying device comprises a conveyor disposed relative to said knife to automatically receive and convey said first package including liver, gallbladder, b 55692040.001 and intestines.

20. The apparatus as in claim 6, wherein said transporting device comprises a stationary support having a slot defined therein defining a conveying track for the entrails packages whereby the packages are conveyed so that the gizzards extend above said support, said transporting device further comprising radial arms rotatable about a central axis with each said arm comprising an outer end projecting into said slot behind the gizzards.

21. The apparatus as in claim 20, wherein said track has a shape such that in the direction of rotation of said arms the distance between said slot and said central axis decreases at least along part of said track, said arms thereby having a variable length, said transporting device further comprising a wheel disposed below said support rotatable about said central axis in synchronism with said radial arms, said wheel comprising a circumferential edge having carriers disposed therealong for receiving and conveying said first packages, said track having a shape so as to reach said circumferential edge in the direction of conveyance before said first separating device such that said carriers are synchronized with said radial arms before said first separating device.

\* \* \* \* \*